US008303826B2

(12) United States Patent
Steiner et al.

(10) Patent No.: US 8,303,826 B2
(45) Date of Patent: Nov. 6, 2012

(54) AUTOMATIC SLURRY STRAINER

(75) Inventors: Carl A. Steiner, Erie, PA (US); Ricky L. Jackson, Union City, PA (US)

(73) Assignee: TM Industrial Supply, Inc., Erie, PA (US)

( * ) Notice: Subject to any disclaimer, the term of this patent is extended or adjusted under 35 U.S.C. 154(b) by 367 days.

(21) Appl. No.: 12/553,210

(22) Filed: Sep. 3, 2009

(65) Prior Publication Data

US 2010/0059457 A1      Mar. 11, 2010

Related U.S. Application Data

(60) Provisional application No. 61/191,050, filed on Sep. 5, 2008.

(51) Int. Cl.
| | | |
|---|---|---|
| *B01D 33/00* | (2006.01) | |
| *B01D 33/06* | (2006.01) | |
| *B01D 33/11* | (2006.01) | |
| *B01D 33/76* | (2006.01) | |
| *B01D 35/16* | (2006.01) | |

(52) U.S. Cl. ........ 210/784; 210/107; 210/157; 210/158; 210/161; 210/383; 210/396; 210/397; 210/402; 210/408; 210/433.1

(58) Field of Classification Search .................. 210/107, 210/157, 158, 161, 396, 397, 784, 402, 433.1, 210/383, 408
See application file for complete search history.

(56) References Cited

U.S. PATENT DOCUMENTS

| | | | | |
|---|---|---|---|---|
| 842,602 | A * | 1/1907 | Wurdack ...................... | 210/397 |
| 4,426,289 | A * | 1/1984 | Svehaug ....................... | 210/403 |
| 5,152,891 | A | 10/1992 | Netkowicz et al. | |
| 5,262,069 | A * | 11/1993 | Kato ............................ | 210/777 |
| 5,332,499 | A | 7/1994 | Spencer | |
| 5,622,625 | A * | 4/1997 | Nagaoka ....................... | 210/232 |
| 7,981,282 | B2 * | 7/2011 | Steiner et al. ................. | 210/157 |
| 2005/0126967 | A1 | 6/2005 | Berry, III et al. | |

OTHER PUBLICATIONS

"Auto-klean filtration" article, Jan. 2006, http://www.auto-kleanfiltration.co.uk/; 2 pages.
"Sieves, Ultrasonics and Filters Specialists for the Process Industry" Russell Finex article, 2008, http://ww.russellfinex.com/; 2 pages.
"Hellan Fluid Strainers—A Product of Cleveland Gear", Feb. 1985, hellansales@hellanstrainer.com; 6 pages.

* cited by examiner

*Primary Examiner* — Duane Smith
*Assistant Examiner* — Paul J Durand
(74) *Attorney, Agent, or Firm* — The Webb Law Firm

(57) ABSTRACT

An automatic strainer assembly for straining a slurry comprises an inlet for receiving the slurry, a horizontally disposed strainer body in fluid communication with the inlet, and a rotatable strainer member received within the body having an inner surface and an outer surface. The strainer member defines a plurality of passageways for strained fluid to pass therethrough. A scraper is positioned substantially adjacent to and contacting the outer surface of the strainer member for removing material from the outer surface of the strainer member. A collection vessel is positioned substantially below the body for receiving material scraped from the outer surface of the strainer member. A helical member is mounted on an internal shaft or auger is located within the strainer member for contacting the slurry to increase mixing and promote flow of the slurry through the system.

20 Claims, 12 Drawing Sheets

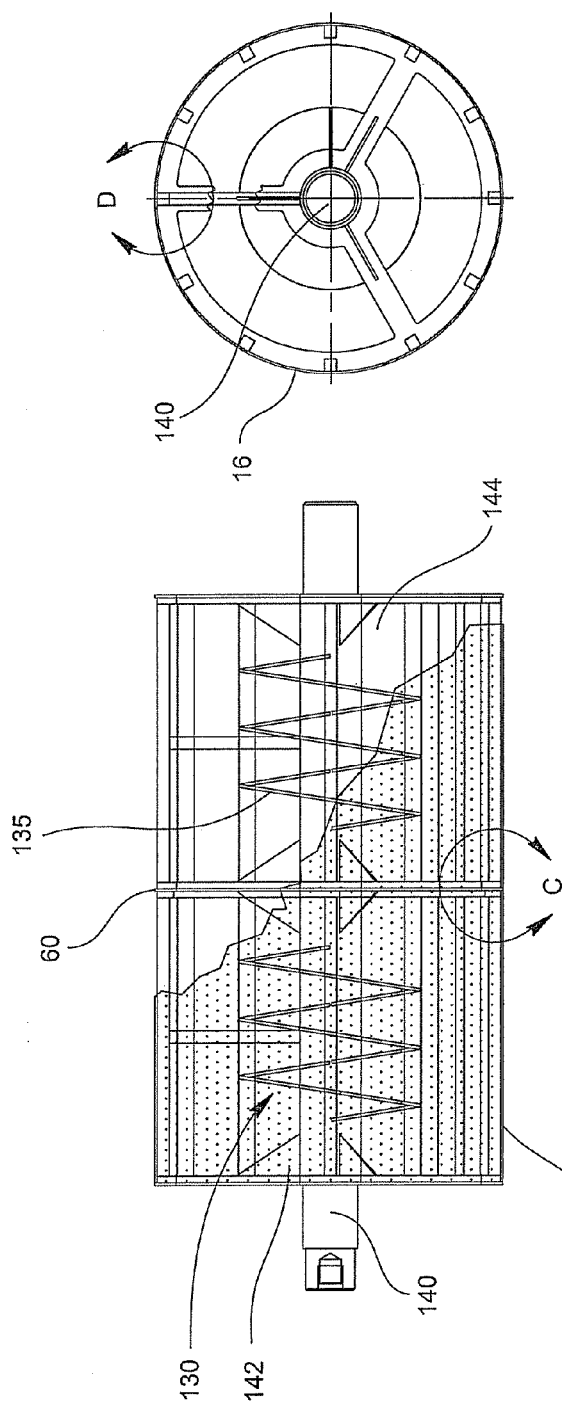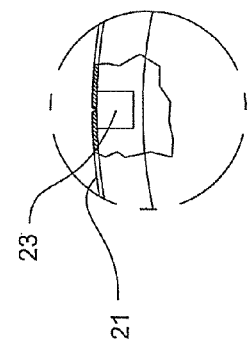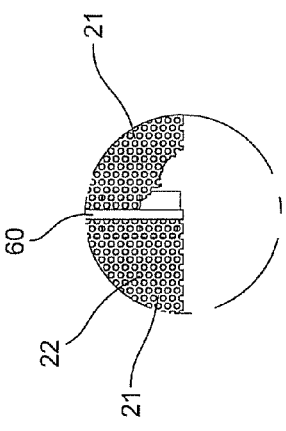
Fig. 7A
Fig. 7B
Fig. 7C
Fig. 7D

US 8,303,826 B2

AUTOMATIC SLURRY STRAINER

CROSS REFERENCE TO RELATED APPLICATIONS

The present application claims priority to U.S. Provisional Patent Application No. 61/191,050, filed Sep. 5, 2008, which is hereby incorporated by reference in its entirety.

BACKGROUND OF THE INVENTION

1. Field of the Invention

This invention relates to a strainer and, more particularly, to an automatic horizontal strainer for the removal of solids or particles from a slurry, such as in the production of ethanol and other types of fluids.

2. Description of Related Art

In the gasoline industry, ethanol blends are quickly becoming the additive of choice in the production of oxygenated fuels in order to meet the ever-increasing environmental requirements regarding fuel emissions. Examples of ethanol sources include bagasse (forest residue), sawdust, wood waste, yard clippings, rice hulls, corn, soybean, sugar cane, and potatoes, with corn being one of the preferred sources of ethanol. In the manufacture of ethanol, straining of the solids or particles from the mash is a time-consuming effort. Essentially, solids or particles, such as corn solids, are filtered and removed from the fermented liquid by passing a slurry of solids and liquids past a basket-type strainer. Once the basket is filled with solids or particles, the basket must be manually removed and cleaned.

SUMMARY OF THE INVENTION

It is therefore an object of the invention to provide an automatic strainer assembly for use with slurries for straining fluid material and removing solid materials therefrom. It is another object of the invention to provide a strainer assembly for retrieving the solid materials and recycling/reusing these materials. It is yet another object of the invention to provide a strainer assembly having removable components to facilitate cleaning thereof. It is still yet another object of the invention to provide a strainer assembly having a timing mechanism for automatically cleaning out the solid material receptacle. It is another object of the invention to provide an automatic strainer assembly having ergonomically designed components which prevent trapping of solid material pieces in the assembly components and increased overall efficiency of the strainer assembly. It is still another object of the invention to provide the strainer member with a rotatable internal shaft having a helical flange mounted thereon to promote flow of the slurry from a back portion to a front portion of the strainer member to increase mixing of the slurry.

Accordingly, the present invention is directed to an automatic strainer assembly for straining a slurry. The strainer assembly comprises an inlet for receiving the slurry, a horizontally disposed strainer body in fluid communication with the inlet, and a rotatable strainer member received within the body having an inner surface and an outer surface. The strainer member defines a plurality of passageways for strained fluid to pass therethrough. A rotatable internal shaft having a helical flange mounted thereon is located within the rotatable strainer member. This rotatable internal shaft promotes a forward flow of the slurry through the strainer member to increase mixing thereof. A scraper is positioned substantially adjacent to the outer surface of the strainer member for removing material from the outer surface of the strainer member. A collection vessel is positioned substantially below the body for receiving material scraped from the outer surface of the strainer member. An outlet is provided in fluid communication with the horizontal strainer body to expel the strained slurry.

The present invention is also directed to a method for processing a slurry. The method comprises the steps of providing a processor for producing the slurry, feeding the slurry to an inlet of an automatic strainer assembly to strain the slurry, scraping the strained material from the strainer assembly, collecting the strained slurry from an outlet of the strainer assembly, and retrieving the scraped material from the strained slurry and transporting this material back to a predetermined location. The strainer assembly includes a rotatable internal shaft having a helical flange mounted thereon. This rotatable internal shaft promotes a forward flow of the slurry through the strainer member to increase mixing thereof.

These and other features and characteristics of the present invention, as well as the methods of operation and functions of the related elements of structures and the combination of parts and economies of manufacture, will become more apparent upon consideration of the following description with reference to the accompanying drawings, all of which form a part of this specification, wherein like reference numerals designate corresponding parts in the various figures.

BRIEF DESCRIPTION OF THE DRAWINGS

FIG. 7A shows a side elevational view of the strainer member including the auger of the invention;

FIG. 7B shows an end view of the strainer member of FIG. 7A;

FIG. 7C shows an enlarged section of area "C" of FIG. 7A;

FIG. 7D shows an enlarged section of area "D" of FIG. 7B;

BRIEF DESCRIPTION OF THE INVENTION

Figure 1A:
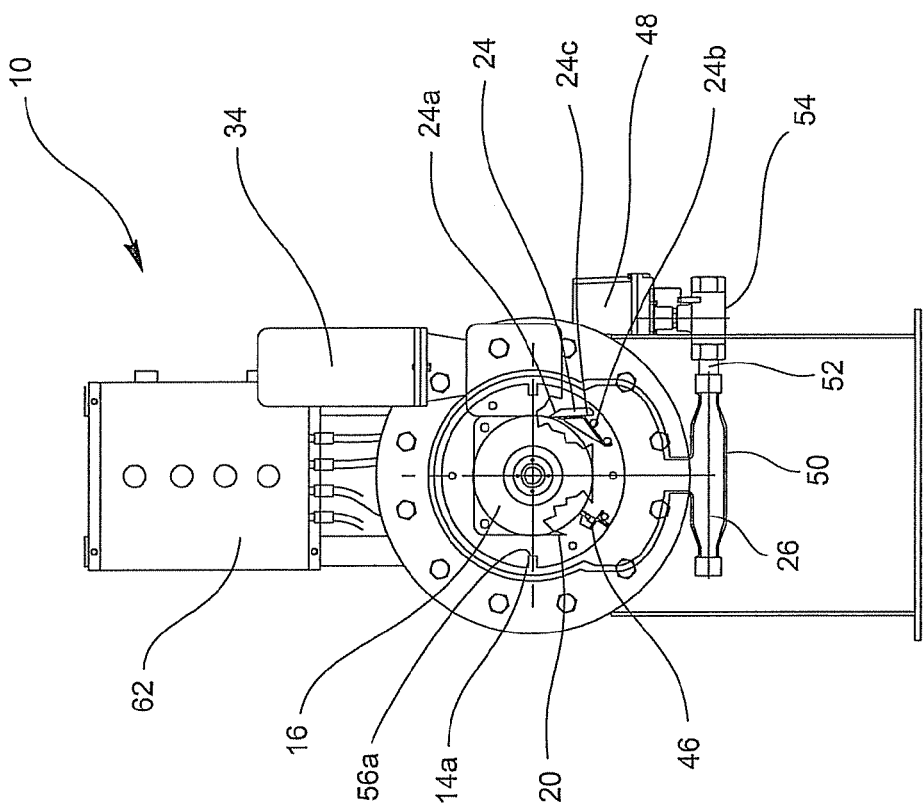
FIG. 1A shows a front elevational view of the strainer assembly according to the invention.
Figure 1B:
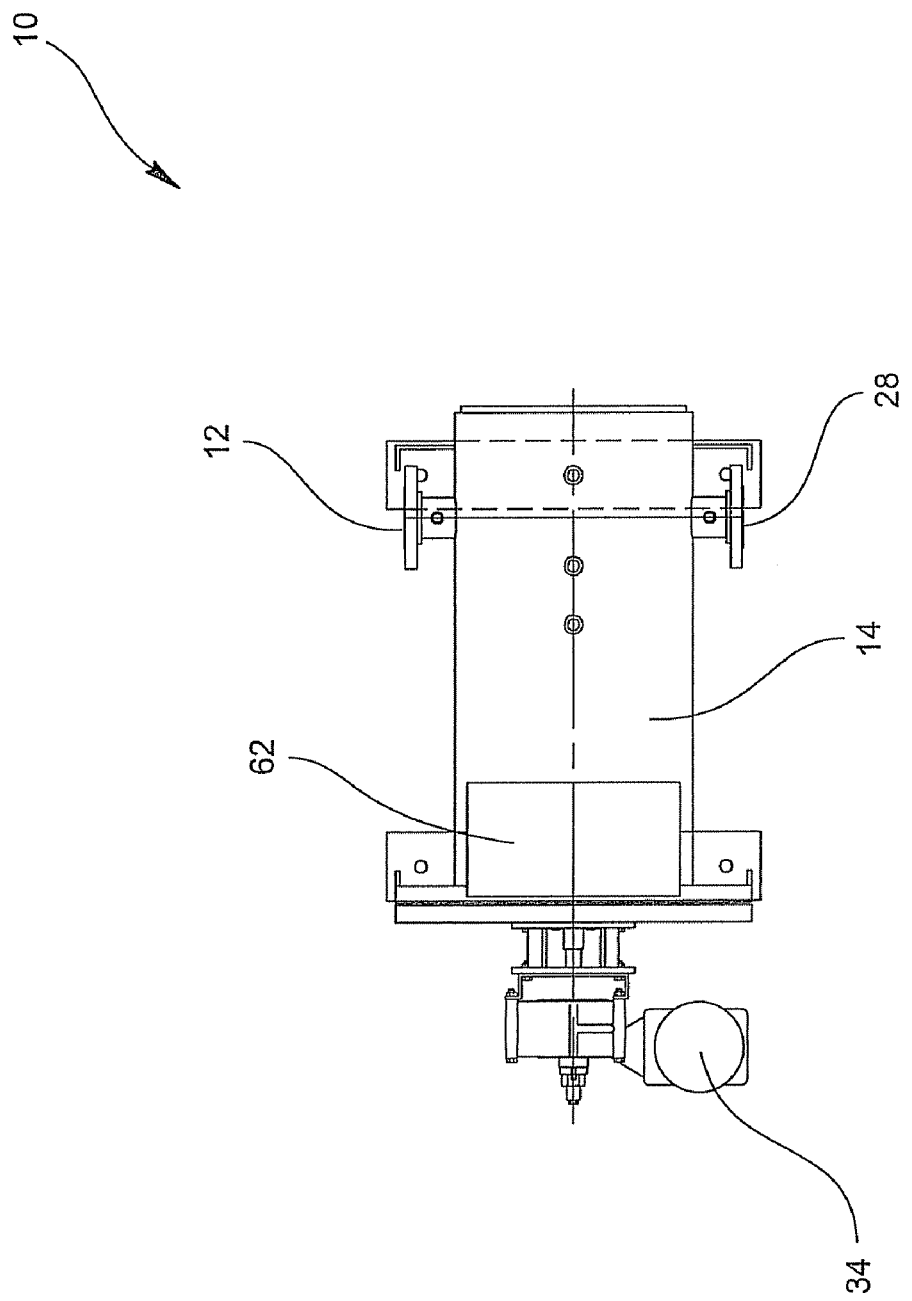
FIG. 1B shows a top plan view of the strainer assembly of FIG. 1.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

The strainer assembly of the invention is used primarily to remove solids or particles from a slurry. One particular use of the invention is in the production of ethanol utilizing organic material, such as, for example, corn, soybeans and sugar cane. It has been found that certain organic materials or solids, after fermentation, tend to stick together and to strainer screens, resulting in difficulty in removing the solids or particles from the strainer screen. The present invention can be used in other industries such as pulp and paper and wastewater, to name a few.

Figure 1C:
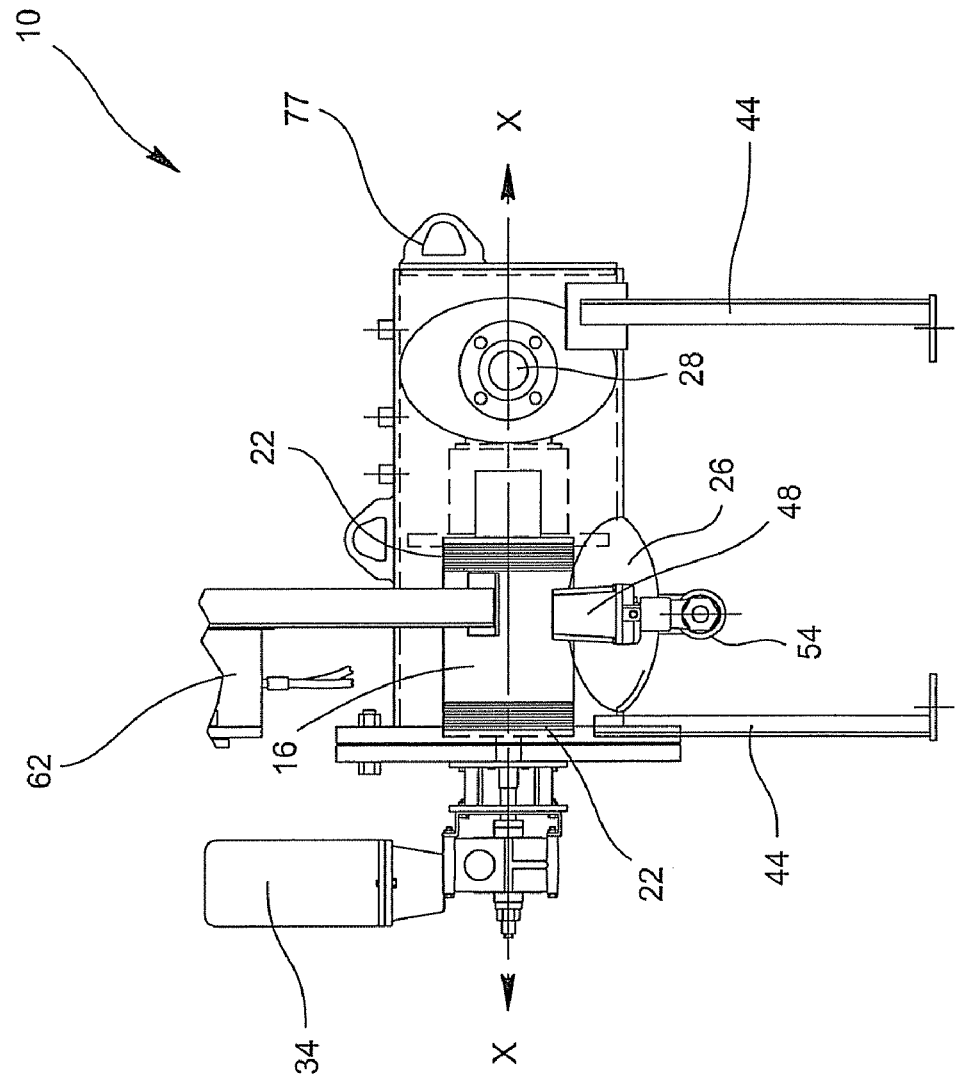
FIG. 1C shows a side elevational view of the strainer assembly of FIG. 1.
Figure 2A:
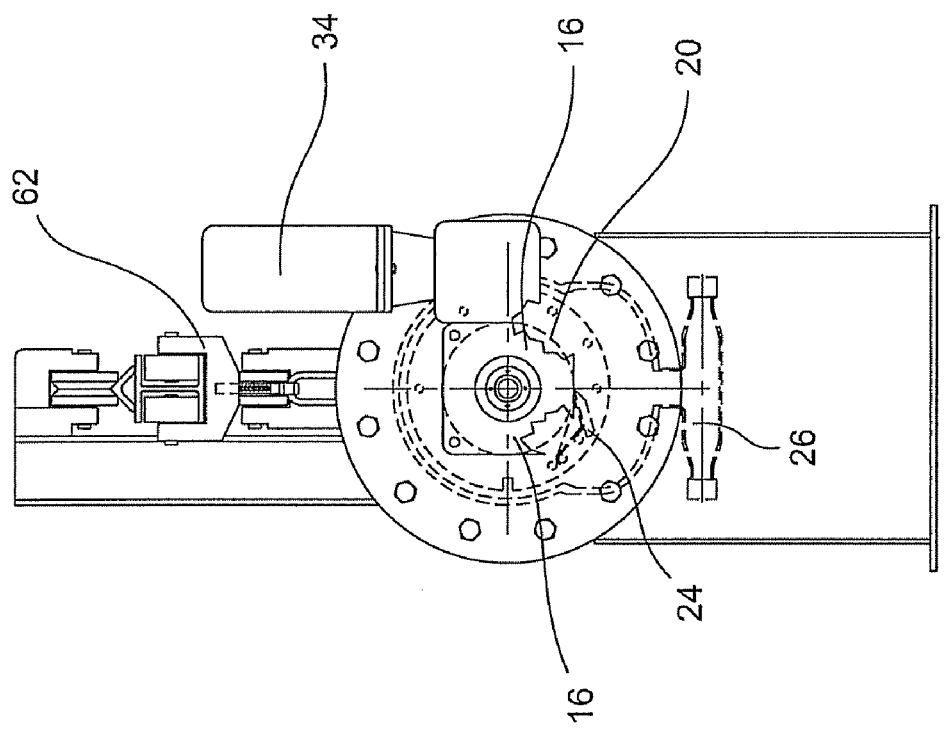
FIG. 2A shows a front elevational view of the strainer assembly of the invention wherein the scraper is positioned at an alternative location.
Figure 2B:
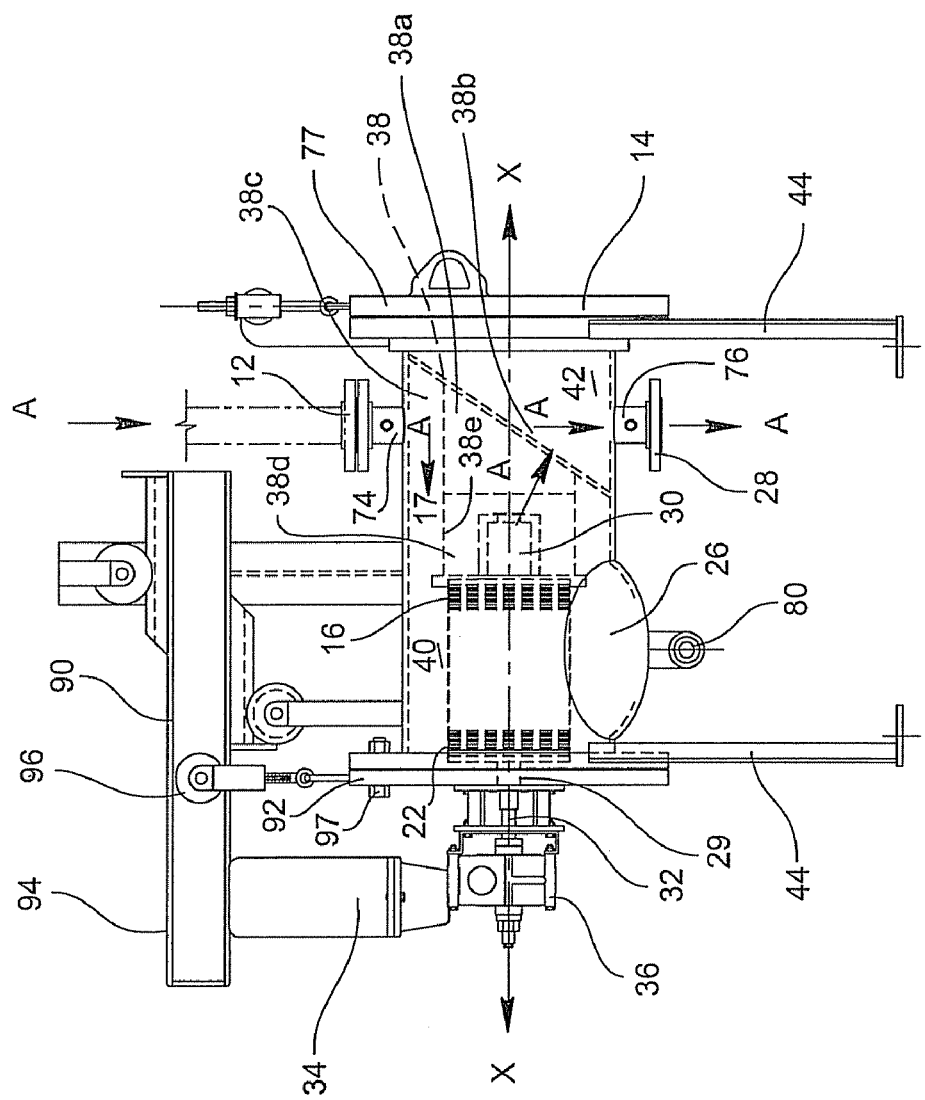
FIG. 2B shows a side elevational view of the strainer assembly of FIG. 2A.
Figure 3:
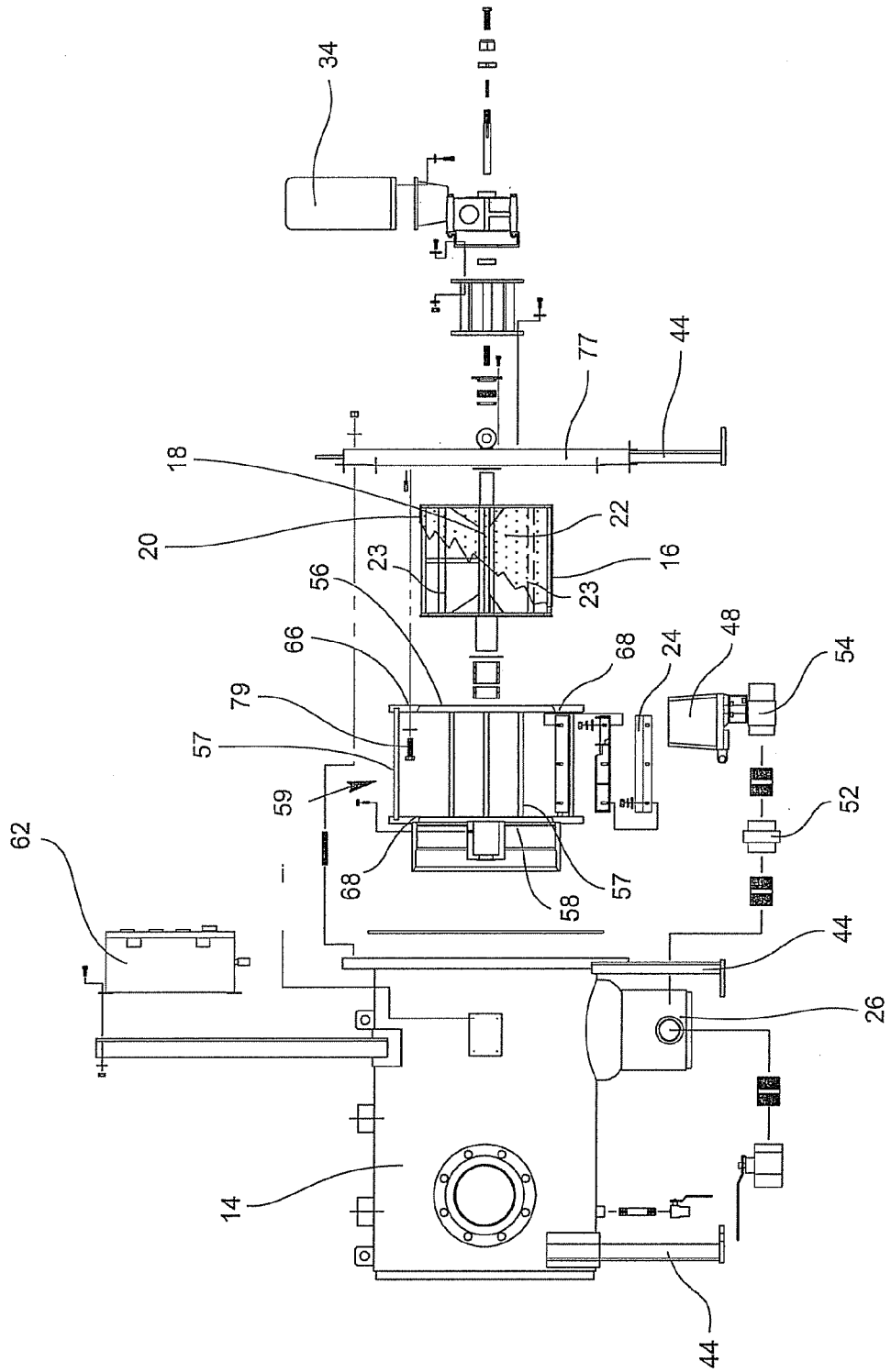
FIG. 3 shows an exploded side elevational view of the strainer assembly of the invention.
Figure 8:
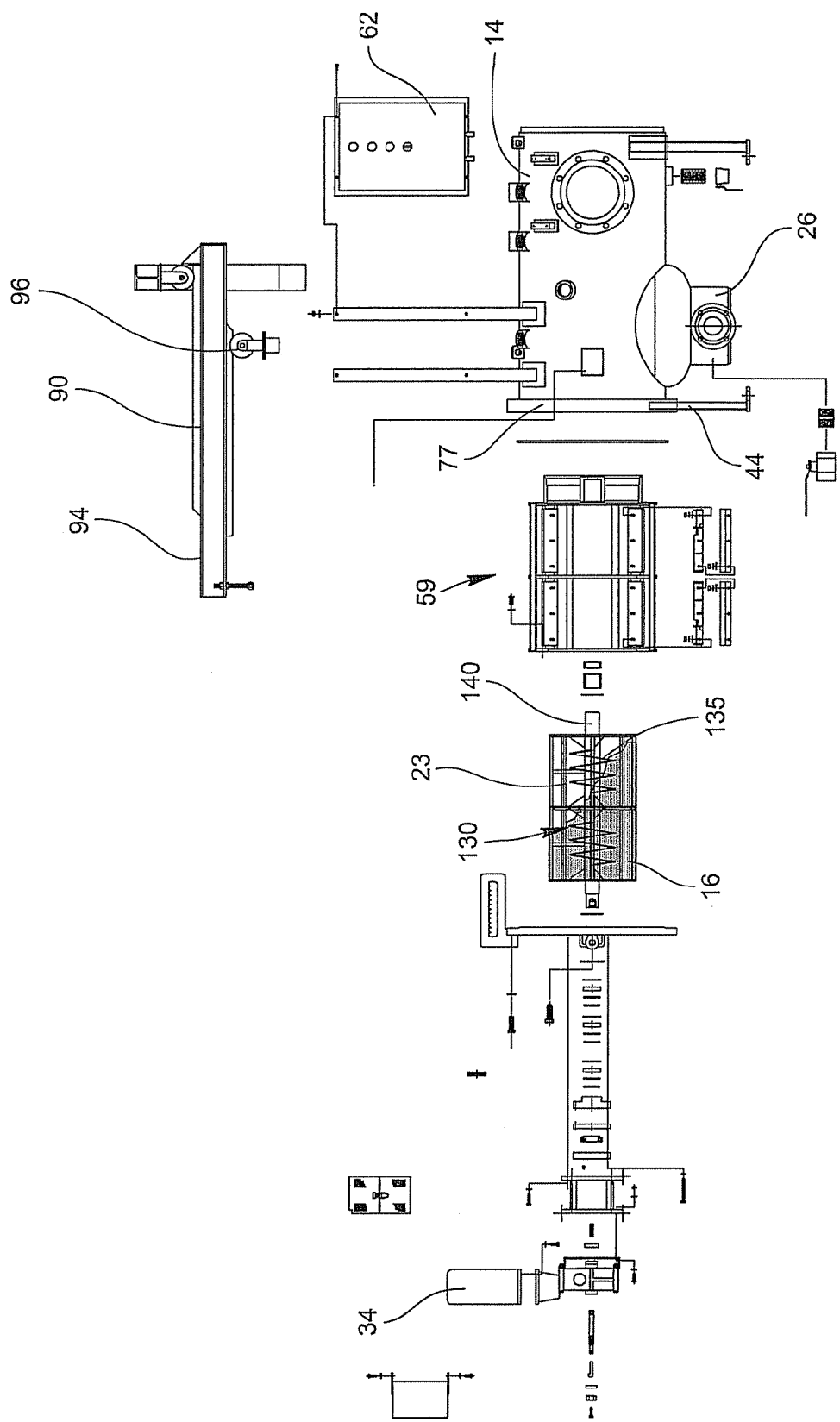
FIGS. 8 and 9 show exploded side elevational views of the strainer assembly including the auger design of the invention.
Figure 9:
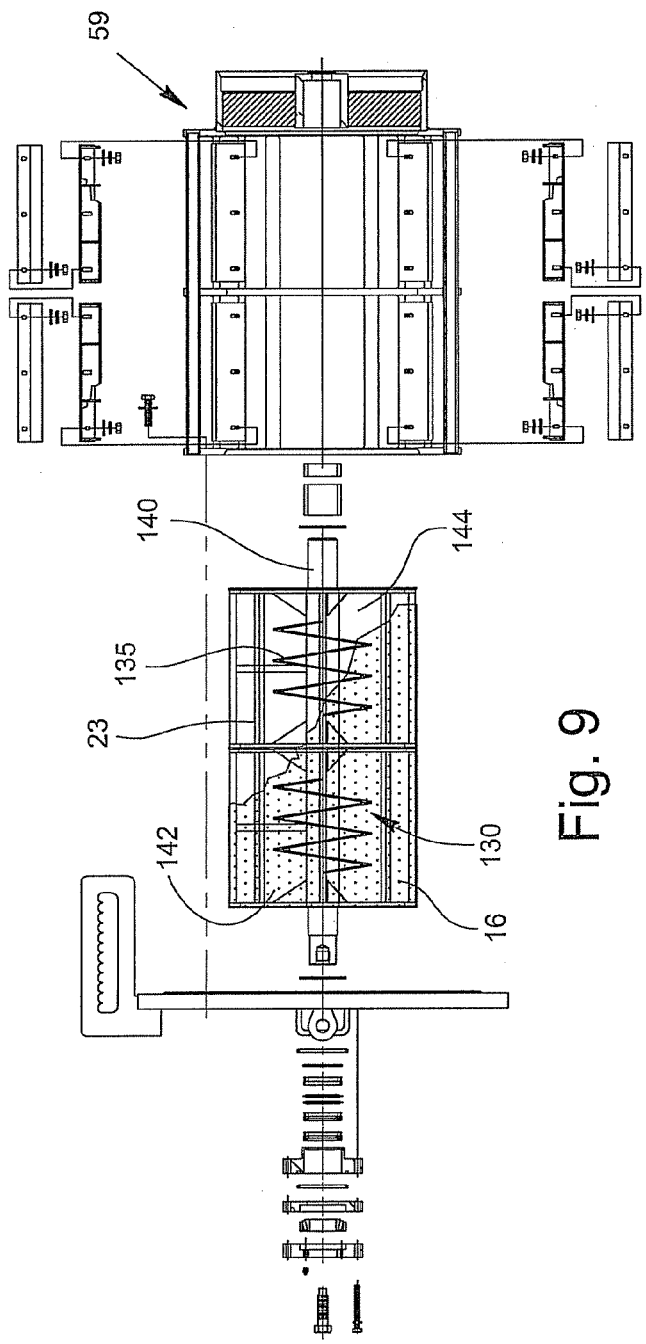

Reference is now made to FIGS. 1A-1C, 2A-2B and 3, which show the strainer assembly, generally indicated as 10, of the invention. The strainer assembly 10 includes an inlet 12 for receiving the slurry, a horizontally disposed strainer body 14 relative to a ground level G in fluid communication with the inlet 12, and a rotatable strainer member 16 received within the body 14. The strainer member 16 has an inner surface 18 and an outer surface 20. The strainer member 16 is preferably a screen-type strainer such as a perforated or wedge wire screen, which defines a plurality of passageways 22 for strained fluid to pass therethrough. As shown in FIGS. 3, 8 and 9, at least one stationary bar 23 is located within the strainer member 16. Preferably a plurality of stationary bars 23 are positioned adjacent the inner surface 18 of the strainer member 16 so that they can support the strainer member 16. These stationary bars 23 act as a natural tumbler wherein the slurry falls on top of the stationary bars 23 to increase the mixing thereof and increase the overall efficiency of the strainer assembly 10. A scraper 24 is positioned substantially adjacent to and in close proximity with the outer surface 20 of the strainer member 16 for removing material from the outer surface of the strainer member 16. A collection vessel 26 is positioned substantially below the body 14 for receiving material scraped from the outer surface 20 of the strainer member 16. An outlet 28 is provided in fluid communication with the horizontal strainer body 14 to expel the strained slurry As illustrated in FIGS. 1C and 2B, the strainer assembly 10 and strainer body 14 are horizontally supported by legs 44. The strainer member 16 is rotatably attached to an interior 17 of the strainer body 14. The strainer member 16 is adapted to rotate about a longitudinal axis X and is rotatably secured with bearings 29, 30 and a drive shaft 32 is drivingly coupled to a motor 34 and a drive 36 to rotate the strainer member 16. A divider plate, generally indicated as 38, is provided within the strainer body 14 for separating an inlet portion 40 and an outlet portion 42 of the strainer interior 17. The divider plate 38 includes a center passageway 38b wherein the plate 38 forms an inlet annulus 38a. The annulus 38a also is defined by an inner surface of the strainer body 14 and a divider tube 38d. An inner surface 38e of the divider tube 38d is in fluid communication with the interior of the strainer member and the outlet 28.

Figure 10:
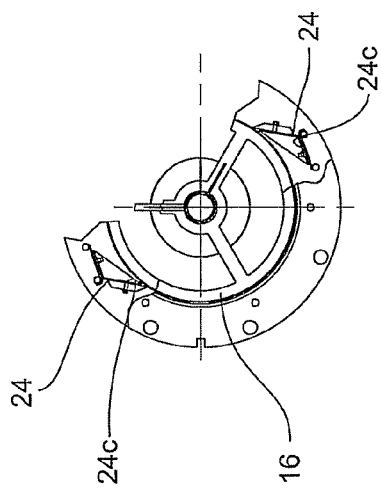
FIG. 10 shows an enlarged detail view of the blade assembly with respect to the strainer member.

In operation, the strainer member 16 is rotated by motor 34 about the X axis. A slurry, such as corn mash, flows from the inlet 12 through the inlet annulus 38a to the strainer member 16, is strained through passageways 22 of the strainer member 16, and then the strained fluid exits through the divider tube 38d, the divider plate center passageway 38b and, through outlet 28, as shown by arrows A in FIG. 2B. As can be appreciated, the divider plate 38 separates the inlet 12 from the outlet 28, thereby causing the slurry to pass through the strainer member 16. At least one scraper 24, as shown in FIGS. 1A, 2A, and 10 is provided adjacent to and in close proximity with the outer surface 20 of the strainer member 16 for removing any solid material remaining or sticking to this outer surface 20. The collection vessel 26 collects this solid material as it is scraped from the strainer member 16.

The scraper 24 may be located at various locations with respect to the strainer member 16. As shown in FIG. 1A, scraper 24 is located to one side of the strainer member 16 prior to the collection vessel 26 with respect to a clockwise rotation of the strainer member 16. As shown in FIG. 1A, preferably the scraper 24, which includes a scraper blade 24a and scraper holder 24b, is positioned to a side of the strainer member 16 between a 30° and 270° angle with respect to a center point of the horizontally disposed strainer member 16 as the strainer member 16 rotates about the horizontal axis X as shown in FIG. 1C. This particular design allows the scraped material to fall into the collection vessel 26 via gravity as the strainer member 16 rotates. Also, the scraper blade 24a is in close proximity with the outer surface 20 and a downwardly sloping surface passageway 24c is defined between outer surface 20, blade 24a and scraper holder 24b to direct any accumulated material located in the passageway 24c into the collection vessel 26.

According to the design illustrated in FIG. 2A, the scraper 24 can be alternatively positioned at a lowermost portion of the strainer member 16 between the strainer member 16 and the collection vessel 26.

As shown in FIG. 10, a pair of scrapers 24 may be provided adjacent the strainer member 16. This pair of scrapers 24 may be positioned at 180° with respect to one another about the periphery of the strainer member 16. Although FIG. 10 shows a pair of scrapers 24, any number of scrapers can be positioned about the periphery of the strainer member 16, depending upon the size of the strainer member 16.

The orientation of the scraper 24 can be manually adjustable with respect to the outer surface 20 of the strainer member to vary the scraping force applied to the material being removed therefrom. The distance between the scraper 24 and this outer surface 20 can also be varied. Additionally, the scraper 24 preferably includes a sharp edge placed in close proximity with the outer surface 20 of the strainer member 16 for cutting any solid particles caught within the passageways 22 of the strainer member. The scraper 24 extends along a major portion of the length of the outer surface 20. Cutting of the solid particles will allow these particles to fall into the collection vessel 26 and reduce the time-consuming process of individually pushing these particles through the passageways 22 with a dowel or any other well-known device. A brush 46 may be provided adjacent to the outer surface 20 of the strainer member 16. This brush 46 is preferably located after the strainer member 16 has rotated past the collection vessel 26 in order to loosen any material remaining on the strainer member 16.

In order to further avoid trapping of particles within the passageways 22 of the strainer member 16, it has been found that passageways 22 having a diameter of approximately 15/64 of an inch works particularly well for corn mash slurries, however the passageway diameter may be optimized for a particular strainer assembly according to the characteristics/particle size of the slurry being processed.

As illustrated in FIGS. 1A and 3, the collection vessel 26 tapers down into a collector 50 that is fluidly coupled to piping components 52 and to valve 54 so that the lowest portions of the collector 50, piping components 52 and valve 54 are aligned with each other to prevent collection of debris. At least one blow-off valve 48, including an actuator, is in fluid communication with the valve 54 for flushing out the material from the collection vessel 26. A timing arrangement may also be provided for automatically actuating this blow-off valve 48.

Controls 62 are provided that can cause the activation of motor 34. Also, the controls 62 include the timing arrangement for periodically opening and closing the blow-off valve 48.

Figure 4:
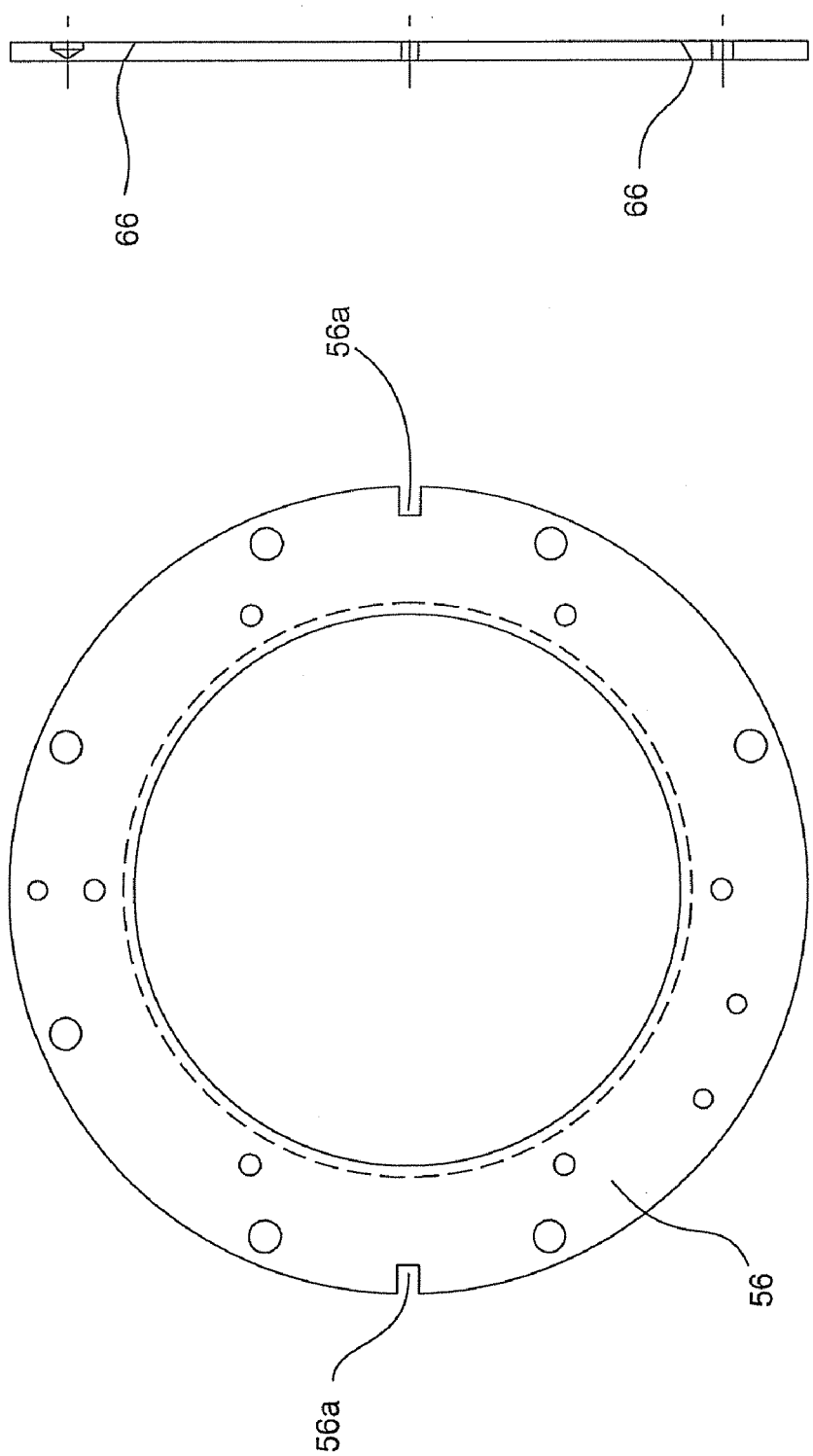
FIGS. 4A and 4B show a front and side view, respectively, of a front plate for supporting the strainer member.
Figure 5:
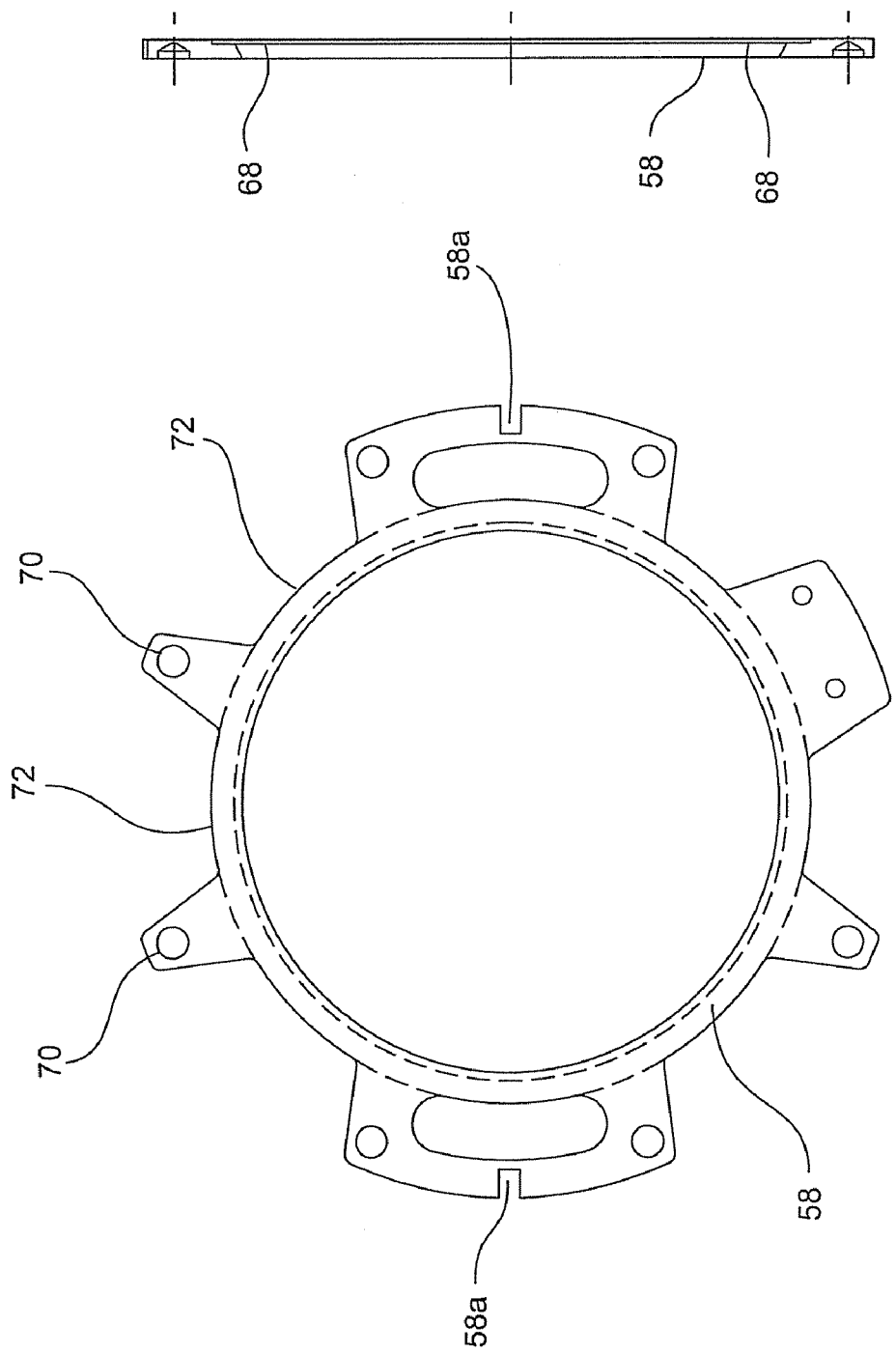
FIGS. 5A and 5B show a front and side view, respectively, of the back plate for supporting the strainer member.

The strainer assembly also includes several ergonomically designed components which improve the efficiency of the strainer assembly. The strainer member 16 is supported by a front plate or ring 56, as illustrated in FIGS. 4A and 4B, and a back plate or ring 58, as illustrated in FIGS. 5A and 5B. A slight space is present between the strainer member 16 and the front and back plates 56 and 58. It has been found that during the straining process, particles can become trapped or lodged in this space. These trapped particles can cause excessive torque and premature wear of the strainer member 16 due to additional drag. When this occurs, the straining process must be stopped and the strainer body 14 disassembled to remove the trapped particles. In order to overcome this problem, the invention utilizes front and back plates 56, 58 having beveled edge portions 66 and 68 for expelling the particles outwardly with respect to the strainer member 16. Additionally, the back plate 58 can comprise a scalloped surface having protrusions 70 and indentations 72 for facilitating flow of the slurry from the inlet 12 toward the strainer member 16.

As shown in FIG. 2B, another ergonomic design of the invention is the provision of graduated flange portions 74, 76 for the inlet 12 and outlet 28. This design allows for progressive funneling of the slurry through the strainer member 16 and reduces head-loss across the strainer assembly 10. In other words, the inlet 12 converges in diameter into the strainer body 14 and the outlet 28 diverges in diameter from the strainer body 14. Also, provided is a davit assembly 90 coupled to the cover 92. The bearing 29 and strainer member 16 are coupled to the cover 92. The davit assembly includes a davit arm 94 and a wheel 96 coacting with the davit arm 94 and cover 92. In operation, when the strainer member 16 is to be inspected, the respective fasteners 97 holding cover 92 in place are moved in the X direction. This in turn permits the strainer member to be removed from the interior of the strainer body 14 so that the strainer member 16 and other strainer components may be inspected. The process is reversed to assemble the strainer.

As shown in FIG. 3, front plate 56 and back plate 58 are welded to rails 57 to form a cage member, generally illustrated as 59. The rotatable strainer member 16 is slid into cage member 59, then cage member 59, containing strainer member 16, is slid into strainer body 14. Guide rails 14a, as shown in FIG. 1A, are provided in the interior of the strainer body 14. Front plate 56 and back plate 58 are provided with notches 56a and 58a, as shown in FIGS. 4A and 5A, which slide along these guide rails 14a during assembly. Cover 77, as shown in FIG. 3, is then attached to the strainer body 14 by a well-known member such as a bolt 79. This design allows the cover to be removed and the strainer member 16 to be easily pulled out of the strainer body 14 for cleaning by an external water source.

Figure 6:
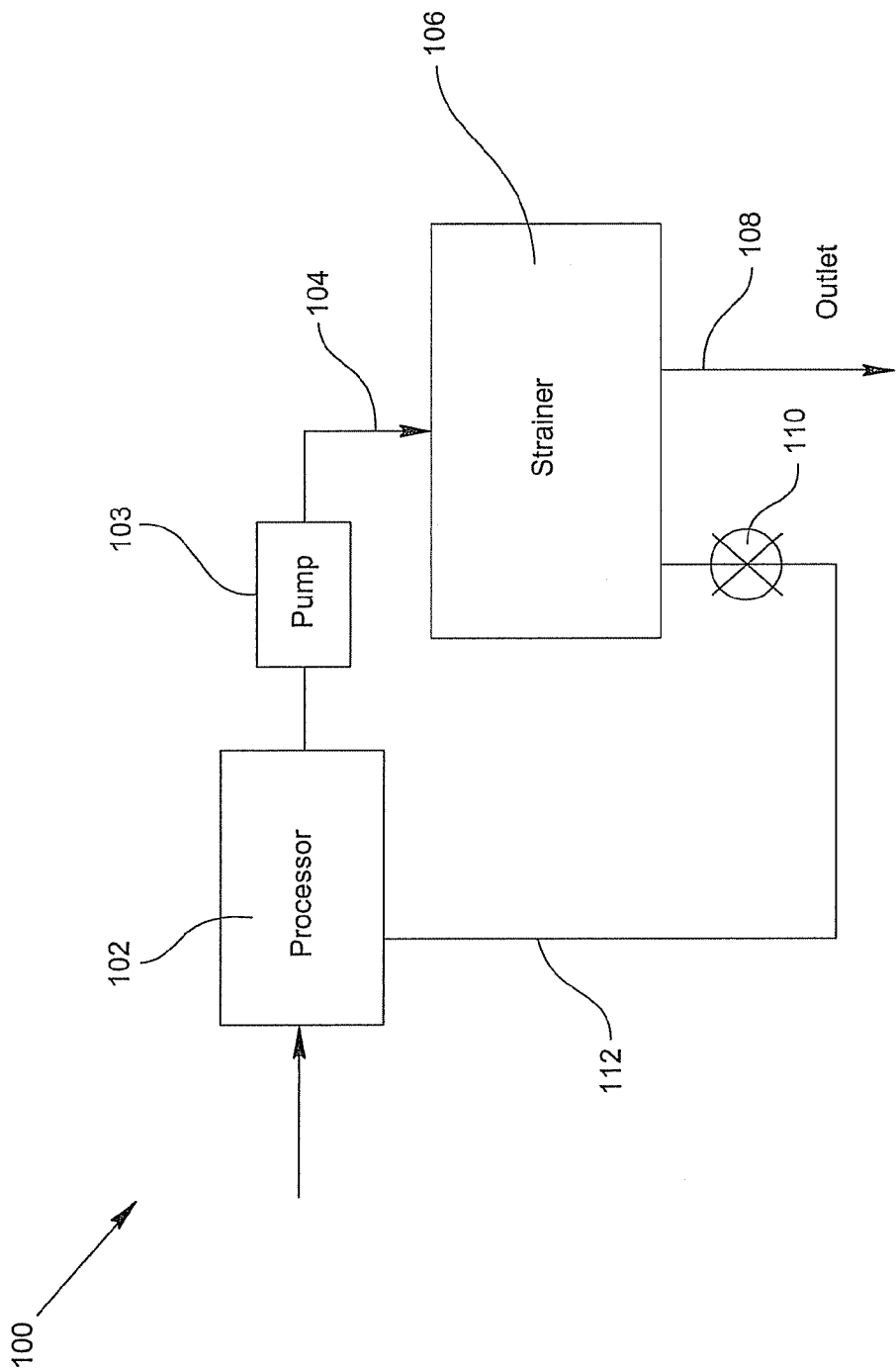
FIG. 6 shows a block diagram showing the recycling method of the invention.

The collection vessel 26 further includes a transport member 80, as shown in FIG. 2B, for removing the material from the collection vessel 26 and redirecting the material to a slurry preparation device. As illustrated in FIG. 6, the present invention provides for a method of processing a shiny, generally indicated as 100. The method includes the steps of providing a processor 102, also known as a mix tank or cooker, for producing the slurry and feeding the slurry via a pump 103 to an inlet 104 of an automatic strainer assembly 106. The strainer assembly 106 can be the strainer assembly 10, as discussed in detail above, or any other type of strainer assembly. This strainer assembly 106 then strains the unwanted sized particles from the slurry and sends the strained slurry to an outlet 108. The method further includes the steps of scraping the strained material from the strainer assembly 106, retrieving the scraped material from the strained slurry via a blowdown pipe 110 and transporting this material 112 back to a predetermined location such as the slurry processor 102 for recycling thereof or a disposal location. It can be appreciated that although FIG. 6 shows the blowdown pipe 110 located between the strainer 106 and processor 102, this blowdown pipe 110 can alternatively be positioned inline between the processor 102 and the pump 103.

As illustrated in FIGS. 7A-7B, 8 and 9, an auger, generally illustrated as 130, is provided within the strainer member 16. This auger 130 consists of a helical flange 135 mounted on internal shaft 140. The auger 130 rotates within the strainer member 16 to promote the flow of the slurry from the back portion 142 to the front portion 144 of the strainer member 16. The strainer member 16 and the rotatable internal shaft 140 are both rotatable about a common axis of rotation. As a result of this movement within the strainer member, increased mixing of the slurry occurs and the overall efficiency of the strainer assembly 10 is increased because more surface areas of the slurry can be contacted by the enzymes. This in turn, results in the overall reduction in the amount of enzymes needed in order to extract the sugars/alcohols from the slurry.

FIG. 7C shows an enlarged section of area "C" of FIG. 7A according to an embodiment of the invention wherein the outer surface 20 of the strainer member 16 can comprise two or more screen members 21 including passageways 22 extending therethrough. These screen members 21 can be secured to a support member 60 of cage 59 by any well known means including welding, brazing, mechanical members, and the like. FIG. 7D shows an enlarged section of area "D" of FIG. 7B showing an end view of a tumbler bar 23 and screen 21. It can be appreciated that tumbler bar 23 can have any geometrical shape including square, rectangular, hexagonal, circular, and the like. It also can be appreciated that the strainer member 16 can include any number of tumbler bars 23.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of this description. For example, it is to be understood that the present invention contemplates that, to the extent possible, one or more features of any embodiment can be combined with one or more features of any other embodiment.

The invention claimed is:

1. An automatic strainer assembly for straining a slurry, said strainer assembly comprising:
    (a) an inlet for receiving such slurry;
    (b) a horizontally disposed strainer body in fluid communication with said inlet;
    (c) a rotatable strainer member received within said body having an inner surface and an outer surface, said strainer defining a plurality of passageways for strained fluid to pass therethrough;

(d) a rotatable internal shaft located within said rotatable strainer member, said internal shaft including a helical flange mounted thereon;

(e) at least one scraper positioned substantially adjacent to an in close proximity with said outer surface of said strainer member for removing material from said outer surface of the strainer member;

(f) a collection vessel positioned substantially below said body for receiving material scraped from said outer surface of said strainer member; and (g) an outlet for expelling the strained slurry in fluid communication with said horizontal strainer body, wherein said rotatable strainer member and said rotatable internal shaft are both rotatable about a common axis of rotation.

2. The strainer assembly of claim 1 wherein the internal shaft having the helical flange comprises an auger and wherein said auger is adapted for contacting the slurry within the strainer member to increase mixing thereof.

3. The strainer assembly of claim 2 wherein said auger promotes flow of the slurry from a back portion to a front portion of the strainer member to increase mixing of the slurry.

4. The strainer assembly of claim 1 wherein the at least one scraper comprises a pair of scrapers.

5. The strainer assembly of claim 4 wherein the pair of scrapers are positioned approximately 180° apart from each other with respect to the outer surface of the strainer member.

6. The strainer assembly of claim 1 wherein the at least one scraper comprises more than two scrapers positioned peripherally about the outer surface of the strainer member.

7. The strainer assembly of claim 1 wherein the at least one scraper includes a downwardly sloping passageway to direct any accumulated material located in the passageway into the collection vessel.

8. The strainer assembly of claim 1 wherein a distance and orientation of said at least one scraper is adjustable with respect to the strainer member.

9. The strainer assembly of claim 1 wherein said strainer member includes at least one stationary bar located therein.

10. A method for processing a slurry comprising the steps of:

(a) providing a processor for producing said slurry;

(b) feeding said slurry to an inlet of an automatic strainer assembly to strain said slurry, said strainer assembly including a rotatable strainer member having an inner surface and an outer surface, said strainer defining a plurality of passageways for strained fluid to pass therethrough, a rotatable internal shaft located within said strainer member, said internal shaft including a helical flange mounted thereon; wherein said rotatable strainer member and said rotatable internal shaft are both rotatable about a common axis of rotation;

(c) scraping strained material from said strainer assembly;

(d) collecting said strained slurry from an outlet of said strainer assembly; and (e) retrieving said scraped material from said strained slurry and transporting said material to a predetermined location.

11. The method of claim 10 wherein the internal shaft having the helical flange comprises an auger and wherein said auger is adapted for contacting the slurry within the strainer member to increase mixing thereof.

12. The method of claim 11 wherein said auger promotes flow of the slurry from a back portion to a front portion of the strainer member to increase mixing of the slurry.

13. The method of claim 10 wherein said automatic strainer assembly comprises a horizontally disposed strainer body in fluid communication with said inlet, a rotatable strainer member received within said strainer body having an inner surface and an outer surface and wherein said internal shaft is located within said strainer member, said strainer member defining a plurality of passageways for strained fluid to pass therethrough, at least one scraper positioned substantially adjacent to and in close proximity with an outer surface of said strainer member for scraping said material from said outer surface of the strainer member, and a collection vessel positioned substantially below said body for receiving said material scraped from said outer surface of said strainer member.

14. The method of claim 13 wherein the at least one scraper comprises a plurality of scrapers positioned peripherally about the outer surface of the strainer member.

15. The method of claim 13 wherein the at least one scraper includes a downwardly sloping passageway to direct any accumulated material located in the passageway into the collection vessel.

16. A system for processing a slurry, said system comprising:

(a) a supply of slurry product;

(b) an automatic strainer assembly for receiving said slurry product, said strainer assembly comprising:

(i) an inlet for receiving said slurry;

(ii) a horizontally disposed strainer body in fluid communication with said inlet;

(iii) a rotatable strainer member received within said body having an inner and an outer surface, said strainer defining a plurality of passageways for strained fluid to pass therethrough;

(iv) a rotatable internal shaft located within said rotatable strainer member, said internal shaft including a helical flange mounted thereon;

(v) at least one scraper positioned substantially adjacent to and in close proximity with said outer surface of said strainer member;

(vi) a collection vessel positioned substantially below said body for receiving said material scraped from said outer surface of said strainer member; and (vii) an outlet for expelling said strained slurry, said outlet being in fluid communication with said horizontal strainer body; and (c) a transport line for transporting said scraped material from said collection vessel to said supply of said slurry product, wherein said rotatable strainer member and said rotatable internal shaft are both rotatable about a common axis of rotation.

17. The system of claim 16 wherein the internal shaft having the helical flange comprises an auger and wherein said auger is adapted for contacting the slurry within the strainer member to increase mixing thereof.

18. The system of claim 17 wherein said auger promotes flow of the slurry from a back portion to a front portion of the strainer member to increase mixing of the slurry.

19. The system of claim 17 wherein said scraper is positioned to a side of the strainer member between a 30° and 270° angle with respect to a center point of said horizontally disposed strainer member as said strainer member rotates about a horizontal axis such that said scraped material falls into said collection vessel via gravity.

20. The system of claim 16 wherein the at least one scraper comprises a plurality of scrapers peripherally positioned about the outer surface of the strainer member and wherein each of said scrapers includes a downwardly sloping passageway to direct any accumulated material located in the passageway into the collection vessel.

* * * * *